2,869,986
RECOVERY OF TUNGSTIC CATALYSTS

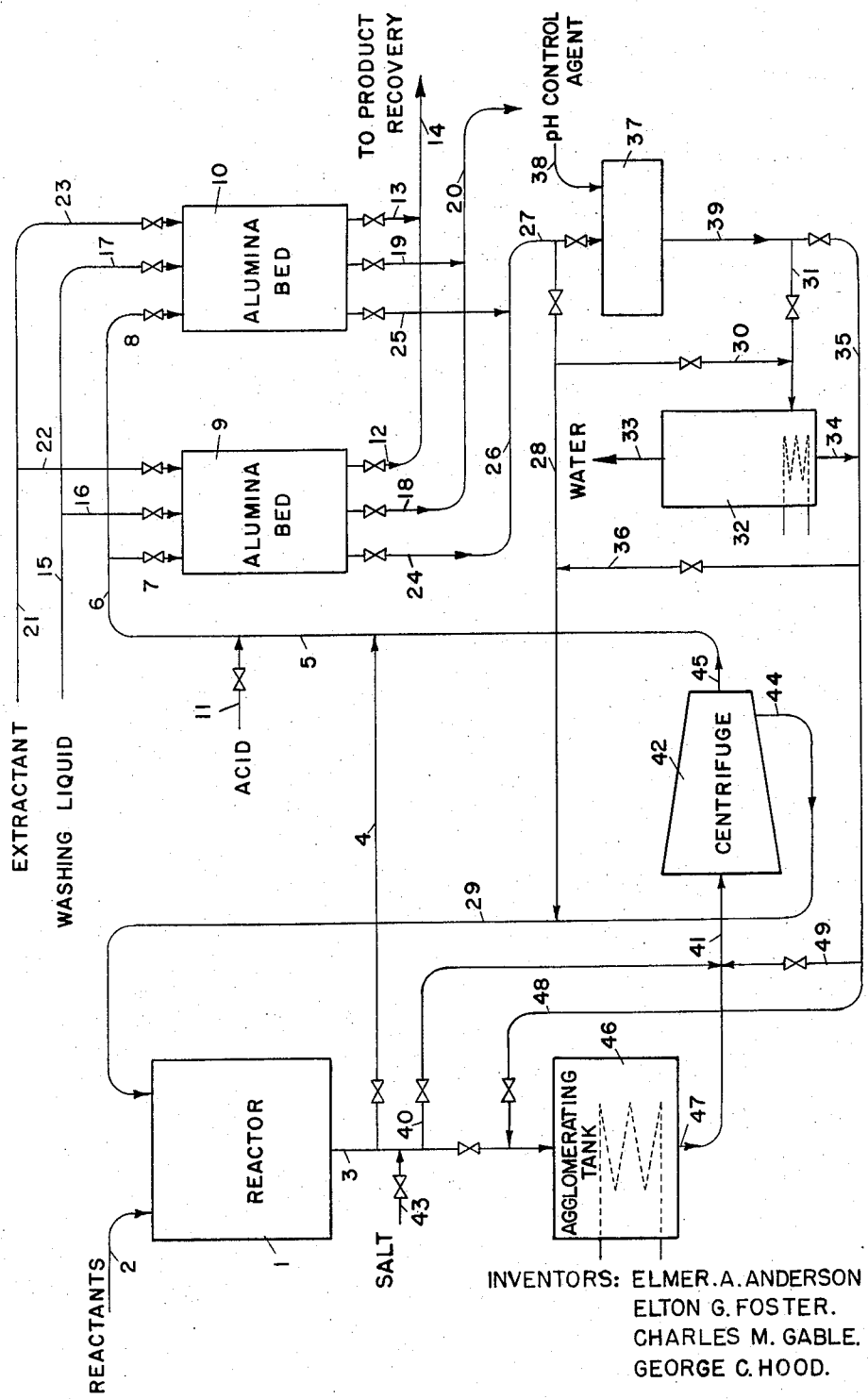

Elmer A. Anderson, El Cerrito, Elton Gordon Foster, Berkeley, Charles M. Gable, El Cerrito, and George C. Hood, Orinda, Calif., assignors to Shell Development Company, New York, N. Y., a corporation of Delaware Application March 31, 1955, Serial No. 498,138

10 Claims. (Cl. 23—140)

This invention relates to the treatment of aqueous reaction mixtures containing tungstic catalysts, that is, tungstic acid or its salts, to recover the catalyst therefrom. It deals with an improved method whereby the tungstic catalyst can be recovered efficiently and economically from such mixtures in a form suitable for reuse as catalyst.

Tungstic acid and its salts are advantageous catalysts for certain reactions, especially the oxidation of organic compounds with peroxides and/or oxygen. Bergsteinsson patent—U. S. 2,373,942, for example, describes a variety of different types of oxidation reactions in which a tungstic acid is a useful catalyst. During these reactions the tungstic acid catalyst is present largely in the form of pertungstic acid which is soluble in the reaction mixture. When reaction of the oxidizing agent is complete, however, the pertungstic acid reverts to tungstic acid which has a substantially lower solubility in water. Depending upon the amount of catalyst used, a part may separate on completion of the reaction. The Bergsteinsson patent recommends recovery of this catalyst by filtration, decantation or centrifuging. This has proved difficult to carry out on a large scale because of the very slow settling rate of the particles and their tendency to either pass through or plug up filtration media. Furthermore, even with the most complete recovery of separated colloidal tungstic acid, the substantial amounts of catalyst remaining in solution are lost by this procedure. These difficulties are largely eliminated by precipitating the colloidal sol with a small amount of a water-soluble polyvalent salt such as aluminum sulfate, calcium chloride, etc., as described and claimed in copending application, Serial No. 286,102, filed May 5, 1952, by Curtis W. Smith. However, the method of recovering the dissolved tungstic catalyst by means of cation and anion exchange resins recommended by Smith leaves much to be desired.

It has been found in accordance with the present invention that tungstic catalysts can be recovered from aqueous media by contacting the catalyst-containing mixture with adsorptive alumina at a pH below about 3, separating the resulting catalyst-containing alumina from the aqueous mixture, and extracting the adsorbed catalyst from the alumina. This method of recovering the catalyst has a number of advantages over prior procedures. It is simple and economical to operate and is capable of recovering better than 99% of the tungstic catalyst.

Different methods of contacting the tungstic catalyst-containing aqueous mixture with the alumina can be used. For example, the aqueous mixture can be percolated through one or more beds of activated alumina at a rate controlled so as to provide a sufficient time of contact for the desired adsorption of the tungstic catalyst. Aqueous mixture practically free from tungstic catalyst can be withdrawn continuously or intermittently from contact with the alumina adsorption bed or beds.

Alternatively, the activated alumina can be added with stirring to the tungstic catalyst-containing aqueous mixture and, after the desired adsorption has taken place, removed by filtration or decantation. In this modification of the process it is usually desirable to use an amount of alumina equal to about 2% to about 20% by weight of the aqueous mixture which is being treated. Larger or smaller amounts of alumina can, however, be used depending upon the tungstic catalyst content of the reaction mixture involved. With viscous reaction mixtures it may be desirable to add water or other suitable solvent to promote adequate contact with the adsorptive alumina and facilitate its subsequent separation.

The process can be carried out with adsorptive alumina. Aluminas having a porosity greater than 30% on a void-free basis are preferred, and most preferably aluminas having a porosity between about 50% and about 70% are used. Porosity, as used herein, refers to interstices or pores of a diameter less than 0.03 millimeter, this being the usual way of defining the porosity of solids. As a rule, it is advantageous to use aluminas having an average pore diameter of about 25 to 250 Angstrom units and a surface area of about 50 to 500 square meters per gram. The manufacture of one suitable type of adsorptive alumina is described in U. S. Patent 1,868,869, for example. A number of adsorptive aluminas meeting the requirements are available, for instance, Alorco Grades F–1, F–20 and H–40 manufactured by the Aluminum Company of America, Harshaw aluminas Grades A, A1–0104 and A1–0501, etc.

The capacity of the alumina (by which is meant the weight of a given tungstic catalyst, expressed for convenience of comparison as weight equivalent of tungstic acid, which can be adsorbed per unit weight of alumina while keeping the tungstic acid content of the treated aqueous mixture below a predetermined maximum, preferably 100 parts per million or less) increases approximately as the square of the mesh size of the alumina particles which are employed. There is a limit to the fineness of the particles of alumina which it is practical to use which will depend somewhat on the method of applying the adsorptive alumina. When using the preferred method of adsorption by percolation through a bed, for example, the alumina should not be so fine as to cause excessive pressure drop through the bed. Alumina mesh size of about 20 to 50 has been found to have a reasonably low pressure drop while providing adequate capacity of adsorption of tungstic catalyst. Finer mesh alumina can be used with a corresponding increase in capacity when the alumina is applied by slurrying with the aqueous tungstic catalyst-containing mixture, but the alumina should not be so fine as to make its recovery from the slurry too difficult. Usually alumina of about 20 to about 100 mesh is preferred, most preferably alumina of about 30 to 60 mesh for slurrying and of about 20 to 40 mesh for use in fixed beds.

The capacity of the alumina for adsorption of tungstic acid has been found to increase with temperature. There is a tendency for the alumina to disintegrate at temperature of about 100° C. or higher in aqueous tungstic acid-containing media so it is generally preferable to operate at about 20° to about 90° C., most preferably between about 45° C. and about 65° C.

The concentration of tungstic catalyst in solution in the aqueous mixture being treated has no effect on the capacity of the alumina. Also, the capacity, in terms of weight of tungstic acid adsorbed per unit weight of alumina of a bed of given size is independent of the size of the bed. With a given size of bed, the capacity is inversely proportional to the rate of feed of tungstic catalyst-containing aqueous solution. Too slow feed rates require beds of an uneconomically large size and it has been found most desirable to use feed rates of about 5 to about 20 volumes of solution per hour per volume of alumina in the bed.

By controlling the operating variables within the indicated preferred ranges, alumina capacities of the order of about 50 to 100 parts by weight of tungstic acid per 1000 parts by weight of alumina are readily achieved with substantially quantitative removal of tungstic catalyst from the feed. For this successful operation, it is necessary that the pH of the solution undergoing treatment be maintained at 3 or below, and preferably below about 2. Very good results have been consistently obtained with solutions of pH about 1 to about 2. Tungstic acid solutions have the required low pH but solutions containing tungstic salts as the cataylsts may require acidification in order to reach the desired pH range. The acidification should be carried out with an acid which is less strongly adsorbed by the alumina than is tungstic acid. Acids having monovalent anions are suitable and are the ones which are preferably used in adjusting the pH of the solution. Nitric, hydrochloric and acetic acids are typical examples of acids which have been successfully employed. In certain cases, for instance, in the recovery of tungstic catalysts from reaction mixtures containing products which tend to react under acid conditions, for example, epoxidation products, it will be desirable to remove such products from the mixture before adjusting the pH to 3 or below.

The tungstic acid catalyst thus removed from the aqueous reaction mixture can be recovered from the alumina on which it is adsorbed in various ways. It is generally desirable to first wash the tungstic acid-containing alumina with a suitable solvent to remove any valuable organic reaction product which may adhere to the alumina. Water, for example, is a useful solvent for such washing in the case of hydroxylation mixtures, for instance.

One suitable method of extracting the adsorbed tungstic acid is by washing with a solution of an alkaline agent. Aqueous solutions of inorganic bases are advantageous extracting agents of this type. Sodium or other alkali metal hydroxide solutions are advantageous. Ammonium hydroxide is particularly useful because the excess base can be separated from the extract by distillation. Such solutions are preferably used in concentrations of about 0.25 to about 10% by weight.

Where the solution is to be used again in the process, it is not essential that all the adsorbed tungstic acid be removed. It is generally desirable, however, to remove sufficient of the acid to insure an adequate adsorption capacity in the ensuing cycle of operation. By the use of about 1-20 bed volumes of aqueous base sufficient extraction of adsorbed tungstic acid can be readily achieved. It is usually desirable to water wash the extracted alumina to remove the base therefrom before reusing the alumina for further extraction of tungstic catalyst. In this way the alumina can be repeatedly reused in the process without substantial loss in efficiency.

The extracted catalyst will be in the form of a soluble salt of tungstic acid when this method of regenerating the alumina is employed. It has been found that the aqueous extract can be recycled directly to the original reaction after appropriate adjustment of its pH where necessary. Thus, when carrying out reactions catalyzed by a tungstic catalyst at a pH in the range of about 1.5 to 7, it is only necessary to add sufficient acid to bring the pH of the extract to the chosen value in this range. Nitric and acetic acids are typical examples of acids which have been found to be especially advantageous in adjusting the pH of the extract solution. Other acids such as sulfuric acid, phosphoric acid, hydrochloric acid, etc. can be sucessfully used depending upon the nature of the reaction which is to be catalyzed. Where the recovered catalyst is to be used in a reaction carried out under alkaline conditions, it is often unnecessary to alter the pH of the extract before recycling it to the reaction. However, it may be desirable to remove from the extract at least a part of the excess base which is preferably used for the extraction before returning the solution of catalyst to the reaction. Where desirable to completely remove the base and to convert the recovered catalyst to free tungstic acid in a pure or substantially pure form, the extract can be advantageously contacted with a suitable cation exchange resin. Dowex-50 has been successfully used in this way. Amberlite IR-112 is another example of a suitable cation removal resin. It is usually unnecessary to purify so completely the catalyst, however. In any case it has been found that the tungstic catalyst in the recycled solution has substantially the same catalytic activity as fresh catalyst in the reaction.

It is usually preferable to remove at least the major portion of any undissolved material, including tungstic catalyst, from the solution being treated before contacting it with the alumina. This is especially recommended when the adsorption is carried out with a fixed bed of alumina since there is a tendency for colloidal tungstic acid to deposit on the surface of the bed and to cause excessive pressure drop. When the slurry method of contacting the alumina with the solution is used, preliminary treatment to remove any colloidal tungstic acid is less essential because it can often be removed together with the added alumina. However, even in this case it is often advantageous to carry out a preliminary separation of undissolved tungstic catalyst before applying the treatment with alumina because recovery of the alumina from the treated solution can then be accomplished in a simpler manner, filtration or decantation being usually suitable. Without the preliminary removal of colloidal tungstic acid, it may be necessary to resort to centrifuging or the like to obtain complete removal of alumina and such undissolved catalyst.

As previously indicated, the preliminary removal of undissolved catalyst can be efficiently carried out by precipitation with a suitable water-soluble salt, preferably about 0.5 to about 6% by weight, based on the tungstic acid content of the mixture, of a polybasic metal chloride, sulfate, phosphate, acetate, or the like. A feature of the present invention is the provision of a new method of removing undissolved tungstic acid in colloidal form without addition of chemicals to the mixture. This method is based upon the unexpected finding that aging of the mixture at an elevated temperature for a suitable period makes it feasible to remove practically all the colloidal tungstic acid by centrifuging for a short time. Presumably some agglomeration of the colloidal particles takes place and is sufficient to make complete removal by centrifugation possible even though it makes no practical difference in the normal settling rate. Thus, with a hydroxylation mixture obtained by reaction of excess allyl alcohol with aqueous hydrogen peroxide using 0.5% tungstic acid as the catalyst and a reaction time of four hours at 50° C., only about two-thirds to three-fourths of the colloidal tungstic acid could be removed by centrifuging for five minutes with a force of about 1000 times gravity. After an additional 3½ hours at the same temperature, practically complete removal of the colloidal tungstic acid was achieved by the same centrifugation. As a general rule, efficient removal of colloidal tungstic acid is made feasible under practical centrifuging conditions by maintaining the mixture at a temperature of about 50° C. to about 95° C. for about 0.1 to about 4 hours prior to centrifugation.

Tungstic catalysts which have been employed in reactions at pH about 5 or higher will usually be completely dissolved in the reaction mixture. It has been found that when the pH of these solutions is adjusted to about 1 to about 2, no separation of colloidal tungstic acid occurs but a supersaturated solution of tungstic acid is obtained. The catalyst can be recovered from these solutions directly, provided they are brought into the required intimate contact with the adsorptive alumina before separation of substantial colloidal tungstic acid takes place. It is usually desirable in these cases to effect contact of the solution with the alumina within about 2 to about 4 hours after adjusting the pH to about 1 to about 2.

The attached drawing is a flow sheet illustrating, diagrammatically, the steps of the new process in certain of its more preferred modifications. In this drawing, which is not to scale and, in the interest of simplification, does not show details such as pumps or other transfer means required, etc., 1 represents a reactor in which a tungstic catalyst or mixture of such catalysts is used to promote the reactions of reactants fed to the system, as by line 2. Aqueous reaction mixture containing the tungstic catalyst is withdrawn from the reactor by line 3. Where the tungstic catalyst is substantially completely in solution in the withdrawn mixture, this solution is conducted by valve-controlled line 4 to line 5 which feeds into header 6. Valve-controlled lines 7 and 8 lead from header 6 to columns 9 and 10, respectively, which are packed with adsorptive alumina of preferably about 20 to 40 mesh size. These beds, which are preferably provided with heating means not shown, are used alternately to allow periodic regeneration of the alumina, after it has adsorbed sufficient tungstic acid catalyst, without interrupting the process. Line 11 is provided for the supply of a suitable acid, when required, to bring the pH of the tungstic catalyst-containing mixture to 3 or lower, preferably between about 1 and about 2. After passage through the alumina bed, or a plurality of such beds, the reaction mixture, now essentially free of tungstic catalyst, passes by line 12 or 13, as the case may be, to header 14 which is connected with the product recovery system, not shown.

While one of the alumina beds is in use for adsorption of catalyst as indicated, the other bed is regenerated by first washing with a suitable solvent to remove reaction product remaining therein. This solvent, preferably water in the case of water-soluble reaction products, is supplied from header 15, via valve-controlled lines 16 and 17, and the washings are withdrawn by lines 18 and 19, respectively, for recovery of product, return to reactor 1, or other disposal, not shown. The adsorbed tungstic acid is then extracted from the alumina by means of a suitable agent, advantageously an aqueous solution of a base, supplied from header 21 by line 22 or 23, depending upon the bed which is being regenerated. The extract is taken off by line 24 or 25 to header 26 which feeds into line 27. The alumina bed under regeneration is then given a final wash before being returned to tungstic acid adsorption service. This wash is shown in the drawing as being carried out with the same solvent, for instance, water, as was used in the previously described washing operation. The washings can generally be used in making up the extractant which is supplied by line 21. Where different solvents are used for the two washing operations, an additional set (not shown) of supply and draw-off lines for the alumina beds can be provided. After the final washing the alumina bed is returned to the adsorption cycle for the recovery of more tungstic catalyst.

The extracted tungstic catalyst which is collected in line 27 can be treated in different ways depending chiefly upon the nature of the extractant used in its recovery from the alumina and the conditions under which it is used in reactor 1. In many cases it is feasible to conduct the solution of extracted tungstic catalyst directly from line 27, by lines 28 and 29, to reactor 1. This is the case, for instance, when using an aqueous base as the extractant supplied by line 21 and recovering the tungstic acid in the form of a salt which can be used as the catalyst in reactor 1. When too much water would be introduced into the reaction by such direct return of the extract, it is conducted by lines 30 and 31 to an evaporator 32 in which the required amount of water is removed as vapor by line 33, and the thus concentrated product is conducted by lines 34, 35 and 36 back to line 28 for return to the reactor by line 29. Where the catalyst-containing extract is at a pH other than that desired for its return to the reaction, the extract is conducted by line 27 to unit 37 in which it is mixed with acid or basic agent supplied by line 38. The resulting solution is then fed to the reactor directly by lines 39, 35, 36, 28 and 29 or is concentrated in evaporator 32 before such return.

In conducting reactions in unit 1 which result in products containing substantial amounts of colloidal tungstic acid catalyst tending to cause plugging and other difficulties when the reacted mixture is fed directly to the alumina adsorption beds, it is desirable to remove the colloidal catalyst before adsorption of the catalyst in solution. One suitable method of carrying out this removal is to feed the reaction mixture by lines 3, 40 and 41 to a centrifuge 42 after adding a suitable salt, as previously described, to coagulate the colloidal tungstic acid. This salt is supplied by line 43 and should be uniformly admixed with the reaction mixture. In centrifuge 42 solid tungstic acid will be removed from the reaction mixture and can be returned to the reactor by lines 44 and 29. The reaction mixture, now substantially free from undissolved solids but containing a substantial amount of tungstic acid catalyst in solution, is then fed by line 45 to line 5 for treatment with the adsorption alumina as described above to recover the remaining catalyst content.

A preferred alternative procedure for removing such colloidal catalyst before the alumina treatment comprises feeding the reaction mixture by line 3 to a heated coagulating tank 46. In this tank the mixture is maintained at an elevated temperature, preferably about 50° to about 95° C. for a sufficient period, usually about .1 to about 4 hours, to bring about sufficient coagulation of the colloidal catalyst to permit its efficient separation in centrifuge 42. After this centrifugal separation, the reaction mixture and recovered solid catalyst, both free of added chemicals, can be treated as previously described.

The following examples further illustrate the invention and show some of its many advantages.

*Example 1*

The effects of the mesh size of alumina and throughput rate were studied using a reaction product obtained in the manufacture of glycerol by hydroxylating allyl alcohol with aqueous hydrogen peroxide in the presence of 0.5% of tungstic acid based upon the total weight of reaction mixture. In each case the runs were made at room temperature by passing the reaction mixture through beds of alumina of various mesh sizes and flow rates, after the undissolved tungstic acid had been removed. All beds were about 16 millimeters in diameter and about 160 millimeters high except the 8–14 mesh bed, which was about 36 millimeters in diameter by about 480 millimeters high. The feeds in each case contained 1000 parts per million tungstic acid. The capacity was taken as the total tungstic acid adsorbed per 1000 grams of alumina when the concentration of tungstic acid in the effluent reached 100 parts per million.

| Mesh Size of Alumina | Volumes of Reaction Mixture per Hour per Volume of Alumina | Capacity of the Alumina (Parts by Weight of $H_2WO_4$ per 1,000 Parts of Alumina) |
| --- | --- | --- |
| 40–70 | 10 | 140 |
| 20–40 | 10 | 75 |
| 8–14 | 10 | 10 |
| 8–14 | 2.5 | 25 |

The tungstic acid was extracted from these beds with sodium hydroxide of various concentrations ranging from 0.25 to 10%. Overall recoveries in excess of 98% based on the tungstic acid concentration in the original reactor product were obtained using 30 to 12 bed volumes of the above sodium hydroxide solutions, smaller volumes of extractant being required with the more concentrated sodium hydroxide solutions. These extracted catalyst solutions, after acidification to pH about 2 with 10% nitric acid are as effective in the hydroxylation reaction as fresh tungstic acid.

Example II

The effect of temperature on the adsorption of tungstic acid catalyst from the reaction product of allyl alcohol and aqueous hydrogen peroxide was determined by operation of beds which were thermostated at the temperature levels of 25° C. and 60° C. The rate of adsorption as a function of temperature and the capacities of the alumina beds at temperatures between 0° C. and 60° C. were calculated with the following results:

| Temperature, °C. | Observed[a] Capacity (Parts by Weight of $H_2WO_4$ per 1,000 Parts of Alumina) | Calculated Capacity (Parts by Weight of $H_2WO_4$ per 1,000 Parts of Alumina) |
|---|---|---|
| 0 | | 42 |
| 23 | 64 | 76 |
| 60 | 126 | 110 |

[a] 20–40 mesh alumina; 10 volumes of reaction mixture per hour per volume of alumina.

Example III

A continuous catalyst recovery unit was operated with crude aqueous glycerol obtained by hydroxylating allyl alcohol with hydrogen peroxide and containing 0.5% by weight of tungstic acid catalyst. This unit consisted of two beds of 20–40 mesh alumina 100 centimeters high and 35 millimeters diameter, with suitable piping and valve system to facilitate operation of either bed in adsorption service while the other is being extracted with dilute base. In excess of 99% of the tungstic acid was removed at a LHSV of reaction mixture of 10 when maintaining room temperature in the alumina bed. The tungstic acid was extracted from the alumina bed with better than 99% recovery. After water washing of the extracted bed it was found to be effective for repeated adsorption, no evidence of loss of capacity being detectable.

Equally good recovery of catalyst was obtained in similarly treating the products of hydroxylation of allyl alcohol with hydrogen peroxide in aqueous solution using a sodium tungstate catalyst and acidifying the reaction mixture with hydrochloric acid to a pH of about 2 before passage through the alumina column.

Example IV

The product of epoxidation of 1,2,3,4,10,10-hexachloro-1,4,4a,5,8,8a - hexahydro - 1,4,5,8 - endo,exo - dimethanonaphthalene in aqueous tertiary butyl alcohol solution was 30% aqueous hydrogen peroxide, using tungstic acid containing about 0.04 millicurie of $W^{185}$ per gram as the catalyst to produce the insecticide "Dieldrin" (1,2,3,4,10,10-hexachloro-6,7-epoxy-1,4,4a,5,6,7,8,8a-octahydro - 1,4,5,8-endo,exodimethanonaphthalene), was treated to recover the catalyst. The colloidal catalyst was first removed by agglomeration and filtration through a steam jacketed fine sintered glass filter. The hot filtrate was passed at a LHSV of 20 through a bed of 20–40 mesh Alorco F1 alumina while keeping the column temperature at 60° C. by means of a water jacket. The "Dieldrin" was recovered from the effluent by dilution with water and filtration to obtain "Dieldrin" free from tungstic acid. The adsorbed tungstic acid was extracted from the alumina column with 17 bed volumes of 5% aqueous sodium hydroxide. Determinations of the radioactivity of the products gave the following results:

Tungstic acid recovered by filtration___ 36.04% of input.
Tungstic acid recovered from alumina
  column _____ 56.96% of input.
Total tungstic acid recovered_____ 93.00% of input.
Tungstic acid left in "Dieldrin" filtrate 6.47% of input.
Tungstic acid accounted for_____ 99.47% of input.

The process can be successfully applied in the same way to other aqueous tungstic catalyst-containing mixtures. Considerable variation in the process is possible without departure from the invention. For instance, the acidification indicated in the drawing as being carried out by addition of acid in unit 37 has been accomplished by means of cation exchange resins such as Dowex–50 which can be regenerated with acid. Still other changes in the process can be made and it will be understood that the invention is not limited to the methods of operation which have been given by way of illustration of the principles involved, nor by any theory proposed in explanation of the improved results which are obtained.

We claim as our invention:

1. A process for recovering tungstic compound from aqueous solutions of organic compounds containing the same which comprises intimately contacting said mixture containing said tungstic compound in a dissolved state at a pH not greater than 3 with preformed adsorptive alumina to adsorb said dissolved tungstic compound on the alumina, separating the resulting tungstic compound-containing alumina from the aqueous solution of organic compound and extracting the adsorbed tungstic compound from the alumina.

2. A process in accordance with claim 1 wherein the adsorbed tungstic compound is extracted from the alumina with an aqueous basic solution.

3. A process for recovering catalyst from aqueous reaction mixtures containing organic products formed by reaction in the presence of a tungstic catalyst which comprises contacting the reaction mixture containing dissolved tungstic catalyst at a pH of about 1 to 3 with sufficient preformed adsorptive alumina to adsorb therefrom the tungstic catalyst in solution therein, separating the aqueous organic product-containing mixture from the alumina, and extracting the adsorbed tungstic compound from the alumina.

4. In a process for oxidizing an organic compound in an aqueous medium under the catalytic influence of a tungstic catalyst, the improvement which comprises removing any undissolved solids from the reaction mixture, passing dissolved tungstic catalyst-containing solution of organic oxidation product through a bed of granular adsorptive alumina at a pH of about 1 to 3, and subsequently washing the alumina bed with a solvent for the tungstic catalyst adsorbed from solution by the alumina.

5. A process in accordance with claim 4 wherein the adsorbed tungstic catalyst is removed from the alumina by washing with an aqueous solution of a base and the extracted catalyst is returned to the oxidation reaction.

6. A process for recovering catalyst from the products of tungstic acid-catalyzed oxidation of an organic compound containing tungstic acid in colloidal form together with dissolved tungstic acid which comprises removing the undissolved tungstic acid from the mixture by centrifuging the mixture after agglomeration of the colloidal tungstic acid, passing the remaining mixture containing dissolved tungstic acid and organic oxidation product at a pH of about 1 to 3 through a bed of granular adsorptive alumina to adsorb said dissolved tungstic acid on said alumina, washing the alumina with a solvent for the oxidation product, extracting adsorbed tungstic acid from the alumina with an aqueous solution of a base, water-washing the alumina and again contacting it with tungstic acid-containing mixture to adsorb further amounts of catalyst.

7. A process in accordance with claim 6 wherein acid is added to the basic extract and the extract is returned to the oxidation to provide catalyst therefor.

8. A process for recovering tungstic acid from an aqueous mixture containing colloidal tungstic acid together with dissolved tungstic acid and organic compounds which comprises heating said mixture at a temperature of about 50° to about 95° C. for a period of about .1 to about 4 hours to agglomerate particles of colloidal tungstic acid, centrifuging the resulting mixture to separate solid tungstic acid, and contacting the aqueous effluent containing dissolved tungstic acid and said organic compounds with preformed adsorptive alumina at a pH of about 1 to 3 to adsorb said dissolved tungstic acid from solution on to the alumina.

9. In a process for producing hydroxylation products by reacting an ethylenic compound with a peroxide under the catalytic influence of a tungstic acid salt wherein an aqueous reaction mixture containing dissolved tungstic acid salt is obtained, the method of recovering the catalyst from the hydroxylation products which comprises acidifying said mixture to convert tungstic acid salt to free tungstic acid, contacting the mixture containing the dissolved free tungstic acid and hydroxylation products at a pH of about 1 to 3 with preformed adsorptive alumina to effect adsorption of said dissolved tungstic acid thereon, subsequently extracting the alumina with an aqueous solution of an inorganic base reactive with the adsorbed tungstic acid to form a tungstic acid salt and remove said adsorbed tungstic acid from the alumina, and returning the tungstic acid salt to the hydroxylation reaction.

10. In a process for producing hydroxylation products by reacting an ethylenic compound with a peroxide in the presence of a tungstic catalyst whereby aqueous hydroxylation product containing dissolved tungstic acid is obtained, the method of recovering said tungstic acid from the hydroxylation product which comprises passing the mixture containing dissolved tungstic acid and hydroxylation product of said ethylenic compound at a pH of about 1 to 3 through a granular bed of adsorptive alumina of between about 20 and about 50 mesh size at about 40° C. to 70° C., and subsequently extracting the alumina with an aqueous solution of an inorganic base to remove the adsorbed tungstic acid therefrom.

References Cited in the file of this patent

UNITED STATES PATENTS

| | | |
|---|---|---|
| 1,948,407 | Watts | Feb. 20, 1934 |
| 2,373,942 | Bergsteinsson | Apr. 17, 1945 |
| 2,536,768 | Reynolds et al. | Jan. 2, 1951 |
| 2,703,789 | McKinley et al. | Mar. 8, 1955 |

OTHER REFERENCES

Mellor: "Comprehensive Treatise on Inorganic and Theoretical Chemistry," vol. 5 (1924), page 278.

Taylor: Physical Chem., vol. 2, pp. 1695–6, 2nd ed., Van Nostrand, New York, N. Y.